(12) United States Patent
Ko (10) Patent No.: US 8,421,933 B2
(45) Date of Patent: Apr. 16, 2013

(54) SHUTTER GLASSES CAPABLE OF VIEWING A PLURALITY OF TYPES OF MONITORS WHOSE IMAGE LIGHT OUTPUTS HAVE DIFFERENT POLARIZATION DIRECTIONS

(75) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 268 days.

(21) Appl. No.: 13/084,496

(22) Filed: Apr. 11, 2011

(65) Prior Publication Data

US 2011/0317081 A1 Dec. 29, 2011

(30) Foreign Application Priority Data

Jun. 29, 2010 (TW) ................................ 99121385 A (51) Int. Cl.
*G02F 1/1335* (2006.01)
(52) U.S. Cl.
USPC ............................................. 349/13; 349/15
(58) Field of Classification Search ............ 349/13, 349/15
See application file for complete search history.

(56) References Cited

U.S. PATENT DOCUMENTS

| | | | |
|---|---|---|---|
| 6,456,432 B1 | 9/2002 | Lazzaro | |
| 8,284,333 B2* | 10/2012 | Lin et al. | 349/13 |
| 2001/0038491 A1* | 11/2001 | Fergason | 359/466 |
| 2006/0098296 A1 | 5/2006 | Woodgate | |
| 2008/0246897 A1 | 10/2008 | Gaudreau | |
| 2009/0141201 A1* | 6/2009 | Yeh et al. | 349/15 |
| 2010/0201897 A1* | 8/2010 | Saitoh et al. | 349/13 |
| 2012/0033061 A1* | 2/2012 | Ko et al. | 348/56 |
| 2012/0069294 A1* | 3/2012 | Ohno et al. | 351/153 |

FOREIGN PATENT DOCUMENTS

| | | |
|---|---|---|
| CN | 2103824 U | 5/1992 |
| CN | 1121183 A | 4/1996 |
| CN | 201226059 Y | 4/2009 |
| EP | 2 337 370 A2 | 6/2011 |
| TW | 452303 | 8/2001 |
| WO | 9743681 A1 | 11/1997 |
| WO | 9959106 A1 | 11/1999 |
| WO | 2010055936 A1 | 5/2010 |

* cited by examiner

*Primary Examiner* — Mike Qi
(74) *Attorney, Agent, or Firm* — Winston Hsu; Scott Margo (57) ABSTRACT

A three-dimensional liquid crystal shutter glasses includes a frame and two lenses, where the frame includes two sub-frames, the two lenses can be deposed on the two sub-frames in any one of a plurality of specific angles, respectively, and the plurality of specific angles are for a user to watch a plurality of types of monitors whose images have different polarization directions.

13 Claims, 10 Drawing Sheets

SHUTTER GLASSES CAPABLE OF VIEWING A PLURALITY OF TYPES OF MONITORS WHOSE IMAGE LIGHT OUTPUTS HAVE DIFFERENT POLARIZATION DIRECTIONS

BACKGROUND OF THE INVENTION

1. Field of the Invention

The present invention relates to a pair of shutter glasses for viewing stereo images, and more particularly, to a pair of shutter glasses capable of viewing a plurality of types of monitors whose image light outputs have different polarization directions.

2. Description of the Prior Art

Figure 1:
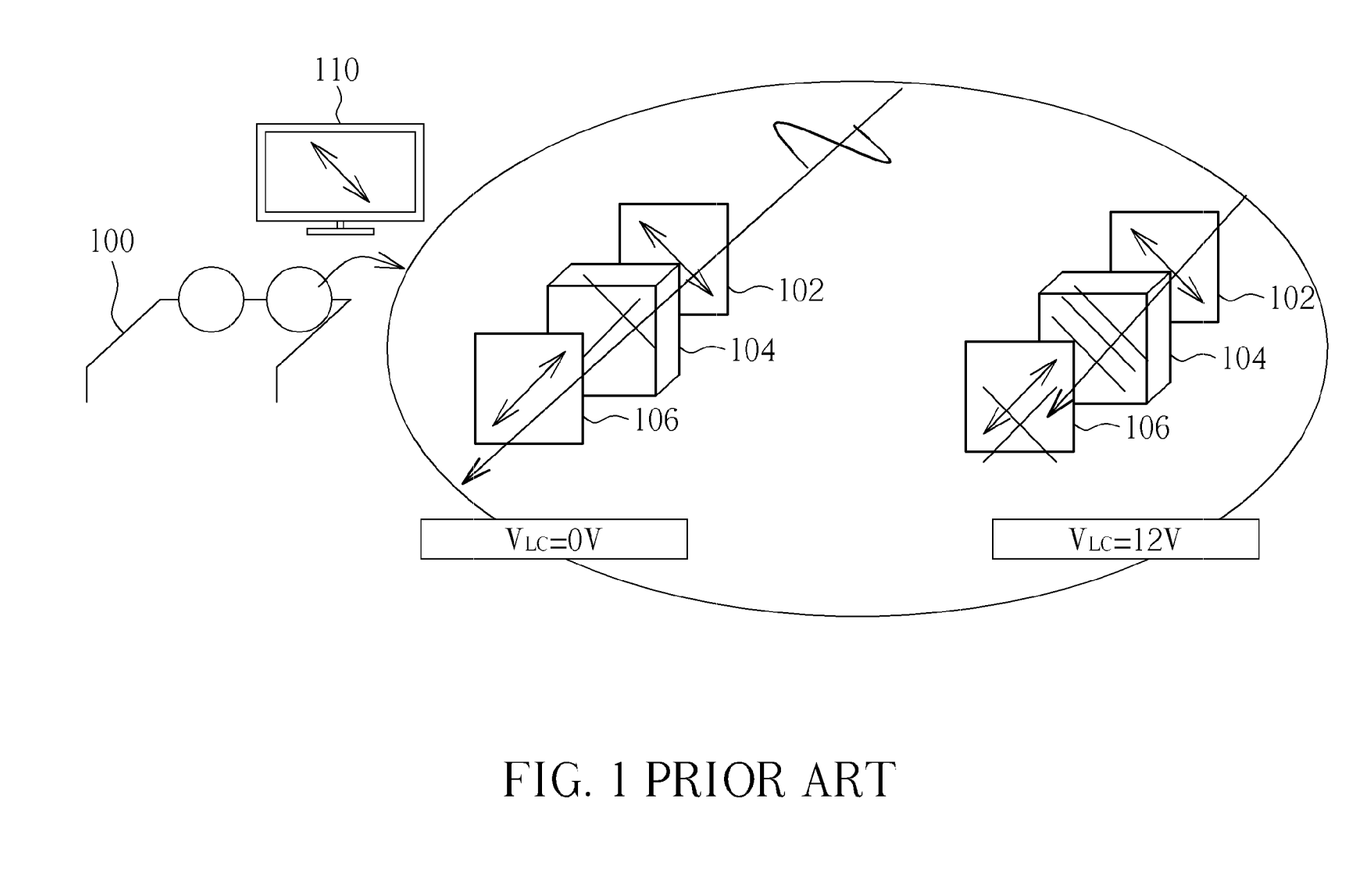
FIG. 1 is a diagram of a construction of conventional three-dimensional glasses and related optical principals thereof.

Please refer to FIG. 1. FIG. 1 is a diagram illustrating a construction of conventional three-dimensional (3D) glasses 100 and related optical principals thereof. As shown in FIG. 1, the 3D glasses 100 are utilized by a user for viewing a monitor 110 which generates an image light output with a polarization direction at 135 degrees. Each lens of the 3D glasses 100 comprises a front polarized lens 102, a liquid crystal (LC) layer 104 and a back polarized lens 106. In accordance with the operation of the 3D glasses 100, the voltage $V_{LC}$ on the LC layer 104 determines whether light is allowed to transmit through the lens. For example, when the voltage $V_{LC}$ on the LC layer 104 is 0V, light transmitted through the LC layer 104 has its polarization direction changed to 45 degrees, and then transmits through the back polarized lens 106 successfully; on the contrary, when the voltage $V_{LC}$ on the LC layer 104 is 12V, light transmitted through the LC layer 104 has its polarization direction still maintained at 135 degrees, and fails to transmit through the back polarized lens 106. Therefore, by providing control voltages to LC layers corresponding to the left-eye lens and the right-eye lens alternately, 3D glasses 100 may let the user's left eye and right eye respectively receive suitable images, leading superimposed images regarded as stereo images in the user's brain.

However, the 3D glasses 100 shown in FIG. 1 are only suitable for monitors whose image light outputs have polarization directions at 135 degrees, rather than monitors whose image light outputs have other polarization directions, such as TN (Twisted Nematic) liquid crystal display (LCD) apparatus whose polarization direction is 45 degrees, IPS (In-plane Switching) LCD apparatus whose polarization direction is 0 degree, VA (Vertical Alignment) LCD apparatus whose polarization direction is 90 degrees, etc. So, since 3D glasses 100 may not be suitable for all types of monitors, manufacturers have to redesign 3D glasses according to each monitor type, and the production cost is increased inevitably. Besides, one user has to buy a plurality of 3D glasses suitable for a plurality of types of monitors, resulting in unnecessary waste.

SUMMARY OF THE INVENTION

Therefore, one of the objectives of the present invention is to provide a pair of shutter glasses with a plurality of types of monitors whose image light outputs have different polarization directions, in order to solve the problem described above.

According to an aspect of the present invention, exemplary 3D glasses utilized for viewing stereo images comprise a frame and two LC polarized lenses, wherein the frame comprise two sub-frames, two LC polarized lenses may be disposed on two sub-frames of the frame according to any one of a plurality of different angles, and the plurality of different angles are respectively defined to view a plurality of types of monitors whose image light outputs have different polarization directions.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
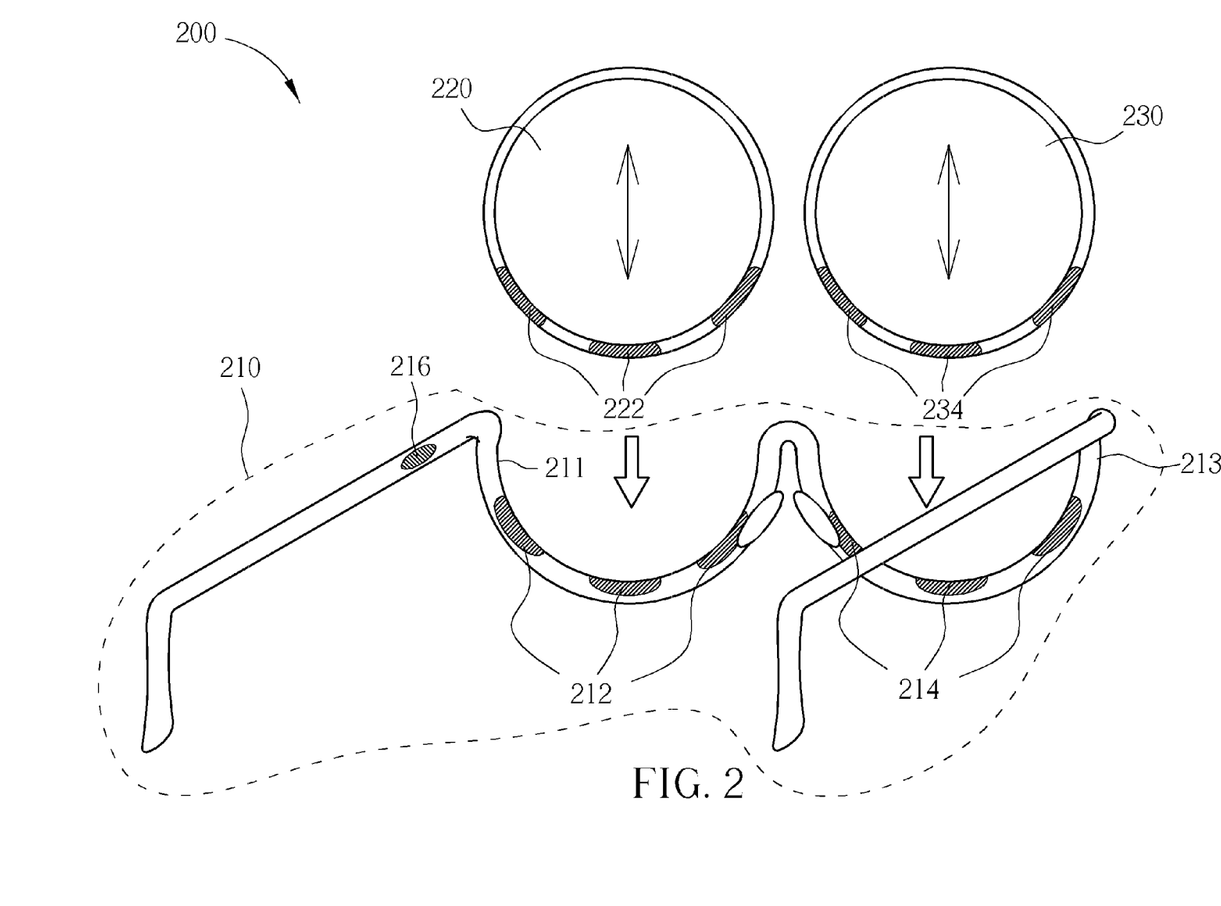
FIG. 2 is a diagram of a pair of shutter glasses for viewing stereo images according to a first exemplary embodiment of the present invention.

Please refer to FIG. 2. FIG. 2 is a diagram of a pair of shutter glasses 200 for viewing stereo images according to a first exemplary embodiment of the present invention. As shown in FIG. 2, the pair of shutter glasses 200 comprises a frame 210, two LC polarized lenses 220, 230, and a battery 216 disposed in the frame 210, wherein the frame 210 comprises two sub-frames 211, 213. Besides, two sub-frames 211, 213 comprise a plurality of connection points 212, 214, respectively. In addition, edges of the LC polarization lenses 220, 230 also comprise a plurality of connection points 222, 234. When the two LC polarization lenses 220, 230 are connected to the frame 210, a control chip (not shown) connected to the battery 216 supplies power to the two LC polarization lenses 220, 230 by at least part of the connect points in the frame 210 and the LC polarization lenses 220, 230. Besides, the two LC polarization lenses 220, 230 may be connected to the two sub-frames 211, 213 of the frame 210 by a latching manner, a magnetic coupling manner or a clipping manner.

Please note that the plurality of the connection points 212, 214 on the frame 210 and the plurality of connection points 222, 234 on the edge of the LC polarization lenses 220, 230 shown in FIG. 1 are for illustrative purposes only. In other exemplary embodiments of the present invention, the frame 210 or edges of the LC polarization lenses 220, 230 may only have one connection point; and each of the LC polarization lenses 230 at the right side and the sub-frame 213 may have connection points on only one of the edges thereof.

Figure 3:
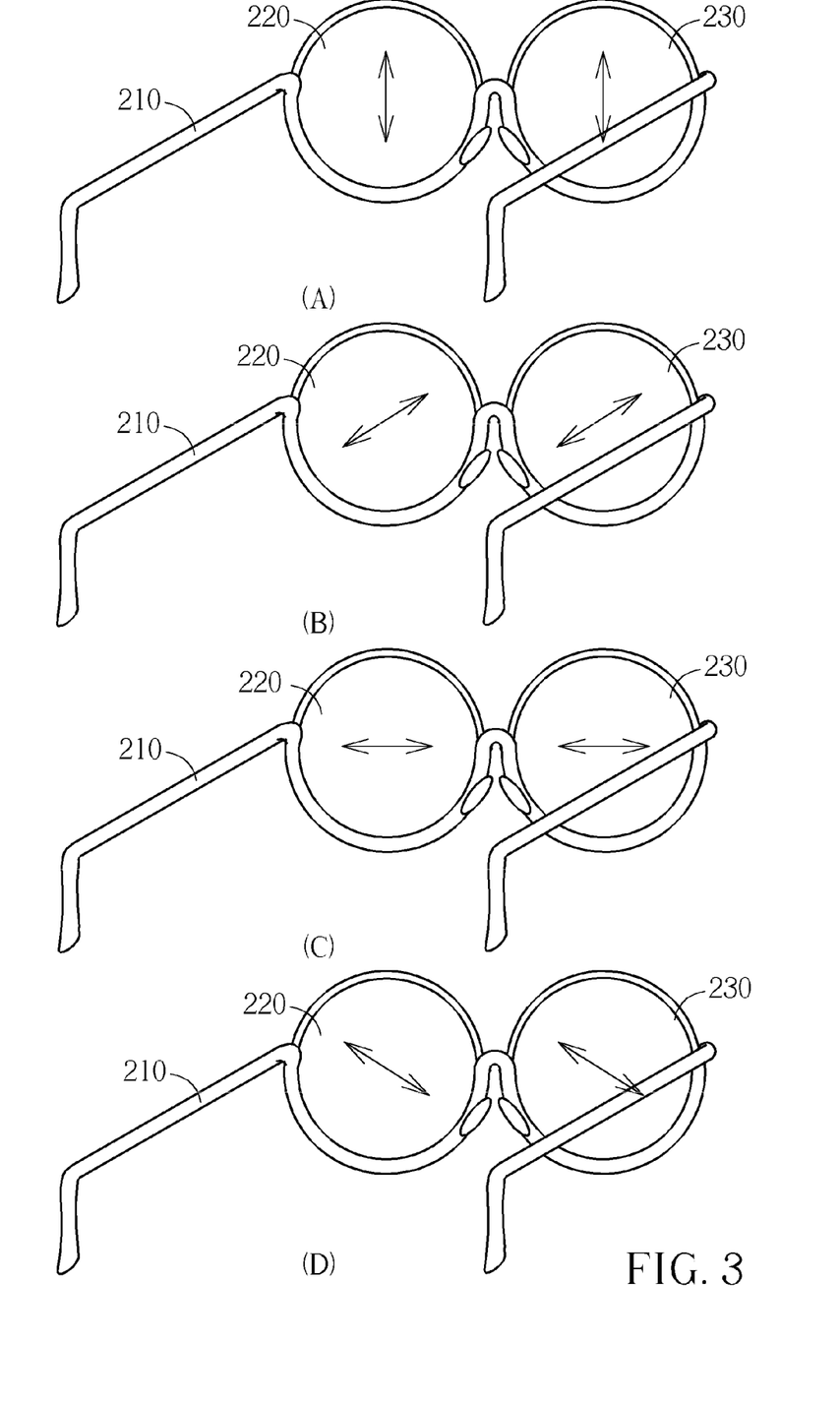
FIG. 3 is a diagram illustrating two liquid crystal polarized lenses shown in FIG. 2 disposed on the frame at 0 degree, 45 degrees, 90 degrees and 135 degrees, respectively.

Besides, the two LC polarized lenses 220, 230 may be any forms of LC polarized lenses. For example, each of the two LC polarized lenses 220, 230 may comprise a first polarized lens, a front glass, an LC layer, a back glass and a second polarized lens in order, or may comprise a group of LC modules (which may comprise one LC layer or two LC layers), a glass, and a polarized lens in order. However, this is not meant to be a limitation of the present invention. Besides, the two LC polarized lenses 220, 230 are respectively disposed on the sub-frames 211, 213 of the frame 210 in any one of the plurality of different angles, and the plurality of different angles are defined for viewing a plurality of types of monitors whose image light outputs have different polarization directions. For example, please refer to FIG. 3, which is a diagram illustrating the two LC polarized lenses 220, 230 being disposed on the frame 210 at 0 degree, 45 degrees, 90 degrees, and 135 degrees, respectively. As shown in FIG. 3, the four installation manners of LC polarized lenses, as shown in sub-diagrams (A), (B), (C), and (D) in FIG. 3, are defined for viewing monitors whose image light outputs have polarized directions at 0 degree, 45 degrees, 90 degrees and 135 degrees, respectively. Thus, manufacturers do not have to redesign 3D glasses according to each monitor type. In this way, the production cost may be reduced greatly. Moreover, the user only needs to buy one pair of 3D glasses to view a plurality of different monitors, which prevents the user from wasting money on buying 3D glasses.

Figure 4:
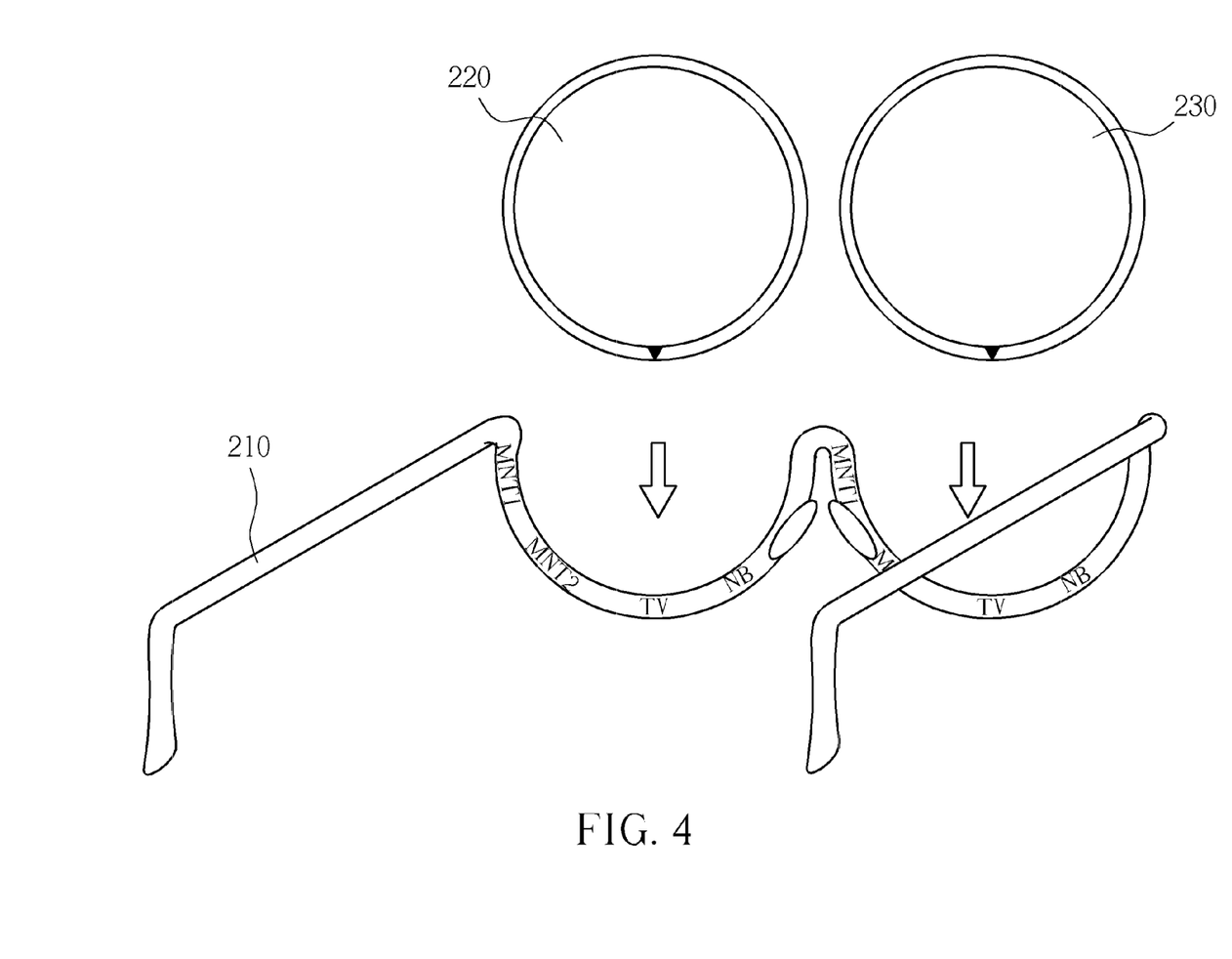
FIG. 4 is a diagram of a plurality of lens installation indicators on a frame shown in FIG. 2.

Besides, regarding one exemplary embodiment of the present invention, please refer to FIG. 4. The frame 210 has a plurality of lens installation indicators MNT1, MNT2, TV, NB respectively corresponding to a plurality of types of monitors whose image light outputs have different polarization directions (e.g. MNT1, MNT2, TV, NB respectively corresponding to monitors whose image light outputs have polarization directions at 0 degree, 45 degrees, 90 degrees, 135 degrees), in order to indicate required lens installation directions of the two LC polarization lenses 220, 230.

Figure 5:
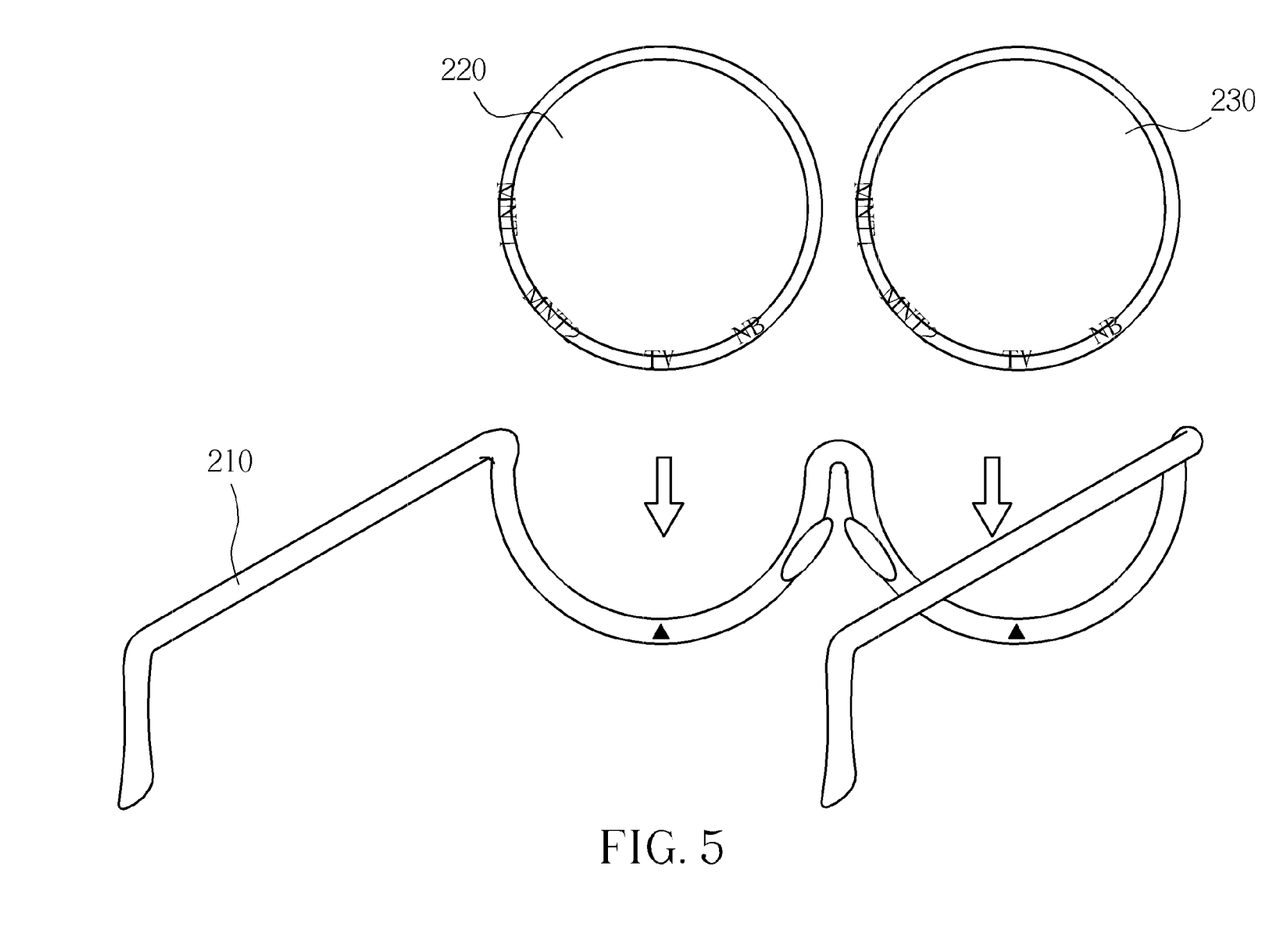
FIG. 5 is a diagram of a plurality of lens installation indicators on two liquid crystal polarized lenses shown in FIG. 2.

Besides, regarding another exemplary embodiment of the present invention, please refer to FIG. 5. There are a plurality of lens installation indicators MNT1, MNT2, TV, NB disposed on the two LC polarized lenses 220, 230, wherein the lens installation indicators MNT1, MNT2, TV, NB respectively correspond to a plurality of types of monitors whose image light outputs have different polarization directions, in order to indicate required lens installation directions of the two LC polarization lenses 220, 230.

Figure 6:
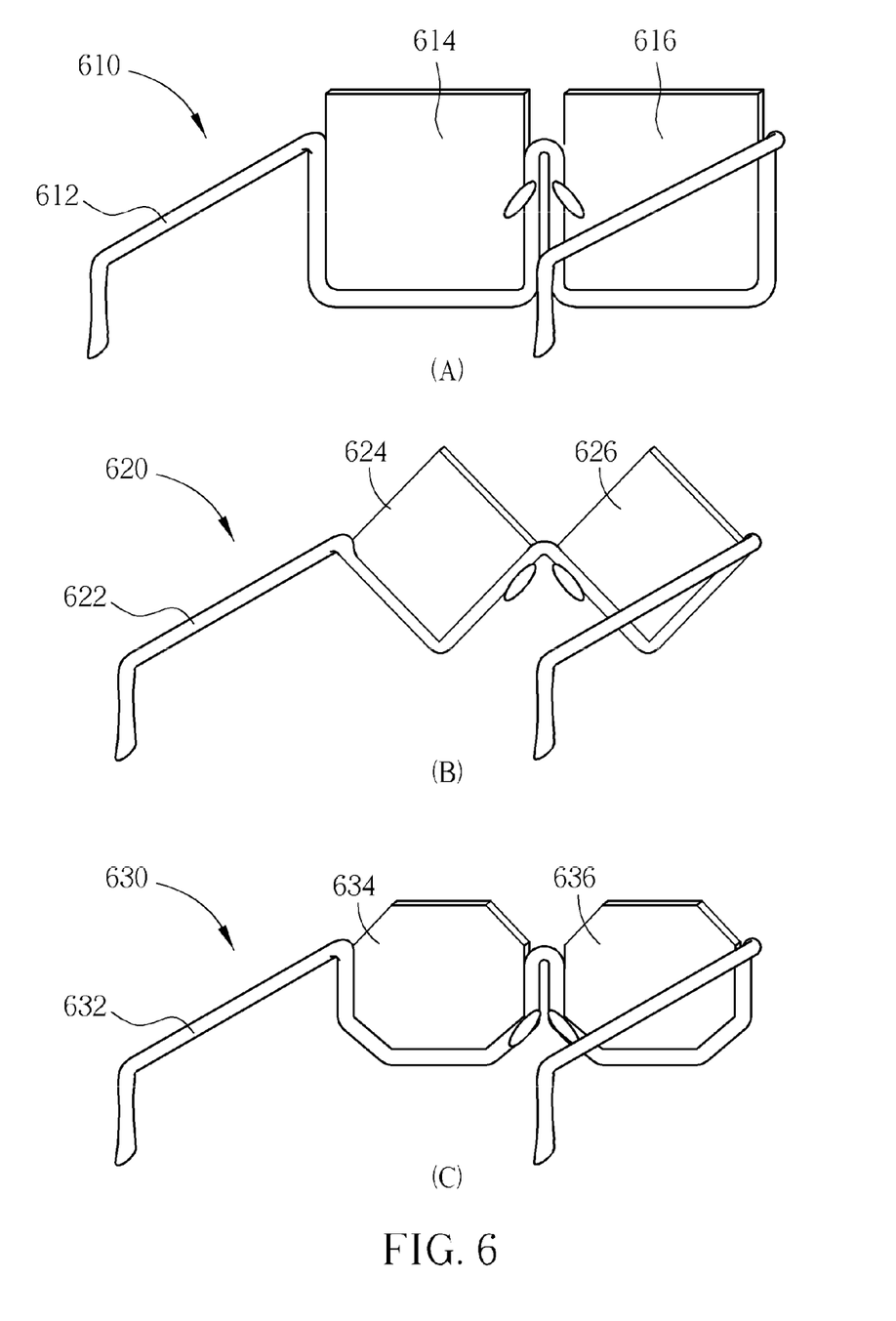
FIG. 6 is a diagram of two liquid crystal polarized lenses of different shapes.

Besides, the two LC polarized lenses 220, 230 shown in FIG. 2 have round shapes. However, it is not meant to be a limitation of the present invention. In other exemplary embodiments of the present invention, the two LC polarized lenses of the present invention may have polygon shapes or any other shapes shown in FIG. 6. As shown in the sub-diagram (A) of FIG. 6, the pair of shutter glasses 610 comprises a frame 612 and two LC polarized lenses 614, 616, and the two LC polarized lenses 614, 616 both have square shapes; as shown in the sub-diagram (B) of FIG. 6, the pair of shutter glasses 620 comprises a frame 622 and two LC polarized lenses 624, 626, and the two LC polarized lenses 624, 626 both have diamond shapes; besides, as shown in the sub-diagram (C) of FIG. 6, the pair of shutter glasses 630 comprises a frame 632 and two LC polarized lenses 634, 636, and the two LC polarized lenses 634, 636 both have octagon shapes. Besides, the LC polarized lenses 614-616, 624-626, 634-636 shown in FIG. 6 are respectively disposed on the frames 610, 620, 630 in any one of the plurality of different angles, where the plurality of different angles are defined for viewing a plurality of types of monitors whose image light outputs have different polarization angles. Please note that the LC polarized lenses may also be connected to the corresponding frame by a latching manner, a magnetic coupling manner or a clipping manner; however, this it is not meant to be a limitation of the present invention.

Figure 7:
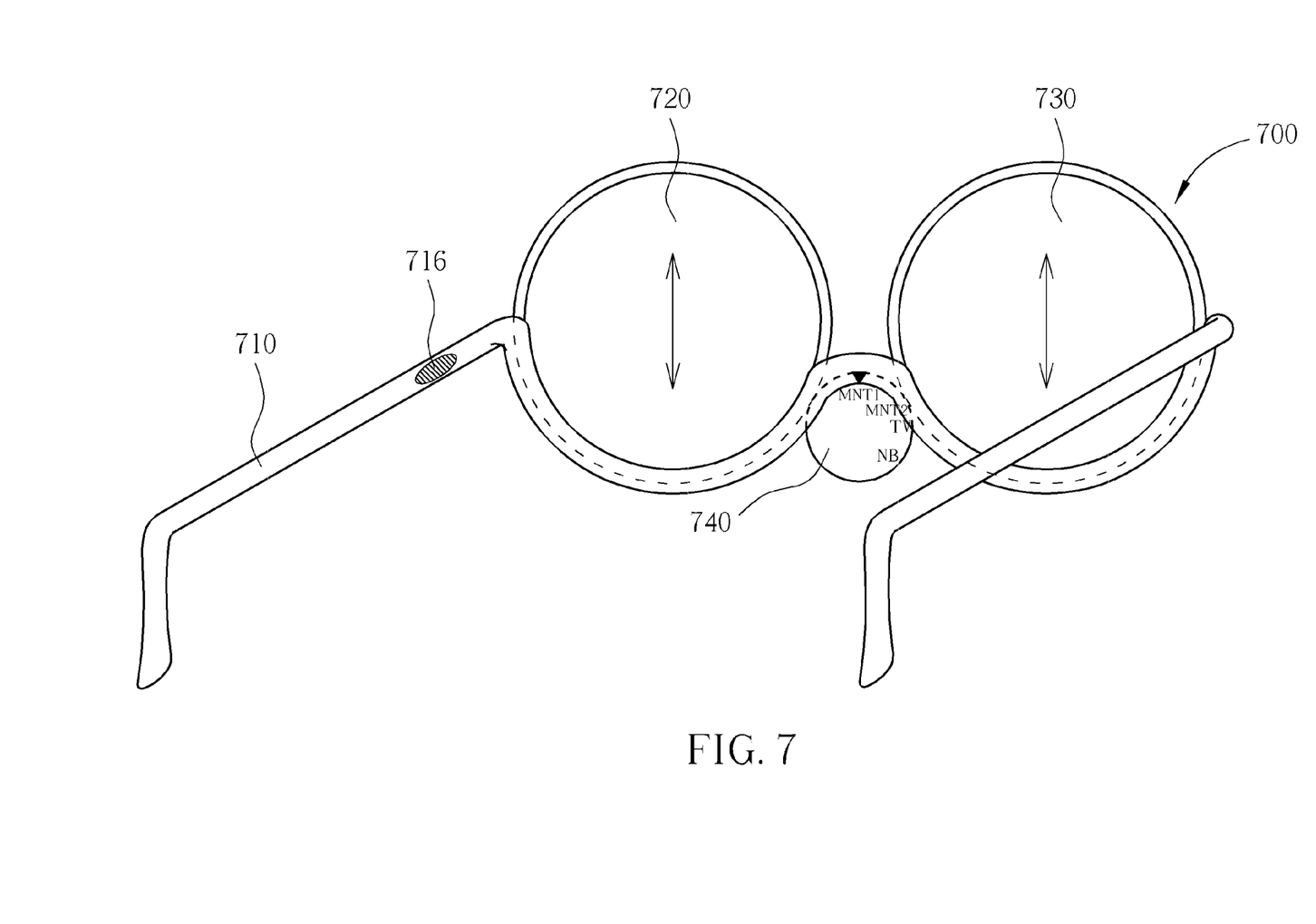
FIG. 7 is a diagram of a pair of shutter glasses for viewing stereo images according to a second exemplary embodiment of the present invention.

Please refer to FIG. 7. FIG. 7 is a diagram of a pair of shutter glasses 700 for viewing stereo images according to a second exemplary embodiment of the present invention. As shown in FIG. 7, the pair of shutter glasses 700 comprises a frame 710, two LC polarized lenses 720, 730, a rotating shaft 740 and a battery 716 disposed in the frame 710, wherein a control chip (not shown), electrically connected to the battery 716, supplies power to the two LC polarized lenses 720, 730. Besides, the two LC polarized lenses 720, 730 may be any forms of LC polarized lenses.

Figure 8:
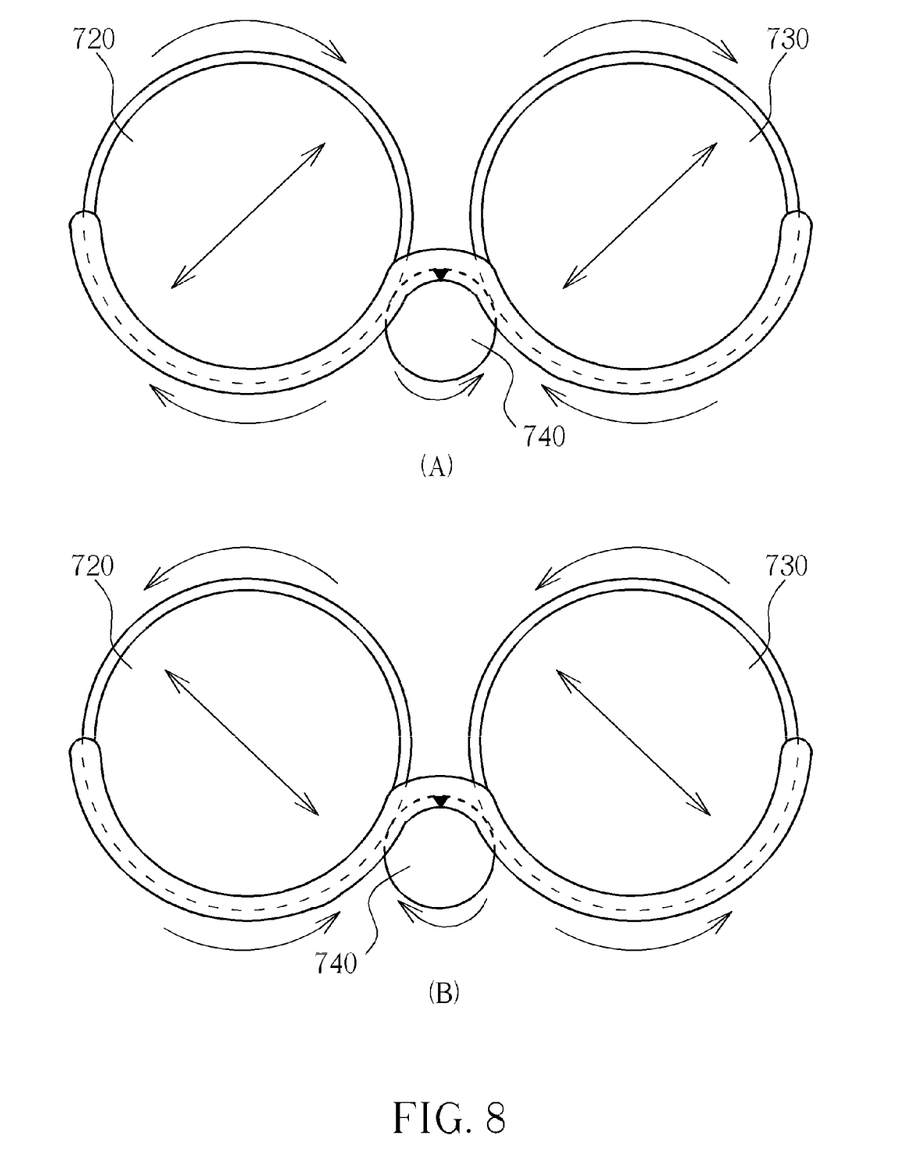
FIG. 8 is a diagram of a rotating shaft shown in FIG. 7 driving two liquid crystal polarized lenses to have rotations.

The two LC polarized lenses 720, 730 have round shapes, and are rotatably fixed on the frame 710, and the rotating shaft 740 is disposed between the two LC polarized lenses 720, 730, and is respectively engaged with the two LC polarized lenses 720, 730 for driving the two LC polarized lenses 720, 730 to have rotations. Please refer to FIG. 8. The sub-diagrams (A) and (B) shown in FIG. 8 are diagrams of the rotating shaft 740 driving the two LC polarized lenses 720, 730 to have rotations, respectively. With the rotating shaft 740 driving the two LC polarized lenses 720, 730 to have rotations, the two LC polarized lenses 720, 730 are disposed on the frame 710 according to any one of a plurality of different angles, where the plurality of different angles are defined for viewing a plurality of types of monitors whose image light outputs have different polarization directions. For example, the two LC polarized lenses 720, 730 are respectively installed on the frame 710 at 0 degree, 45 degrees, 90 degrees and 135 degrees for viewing monitors whose polarization directions are at 0 degree, 45 degrees, 90 degrees and 135 degrees. Thus, manufacturers do not have to redesign 3D glasses according to each monitor type. In this way, the production cost may be reduced greatly. Moreover, the user only needs to buy one pair of 3D glasses to view a plurality of different monitors, which prevents the user from wasting money on buying 3D glasses.

Please note that a plurality of rotating angle indicators MNT1, MNT2, TV, NB on the rotating shaft 740 are respectively corresponding to a plurality of types of monitors whose image light outputs have different polarization directions, thereby indicating the required angle of the rotating shaft 740.

Figure 9:
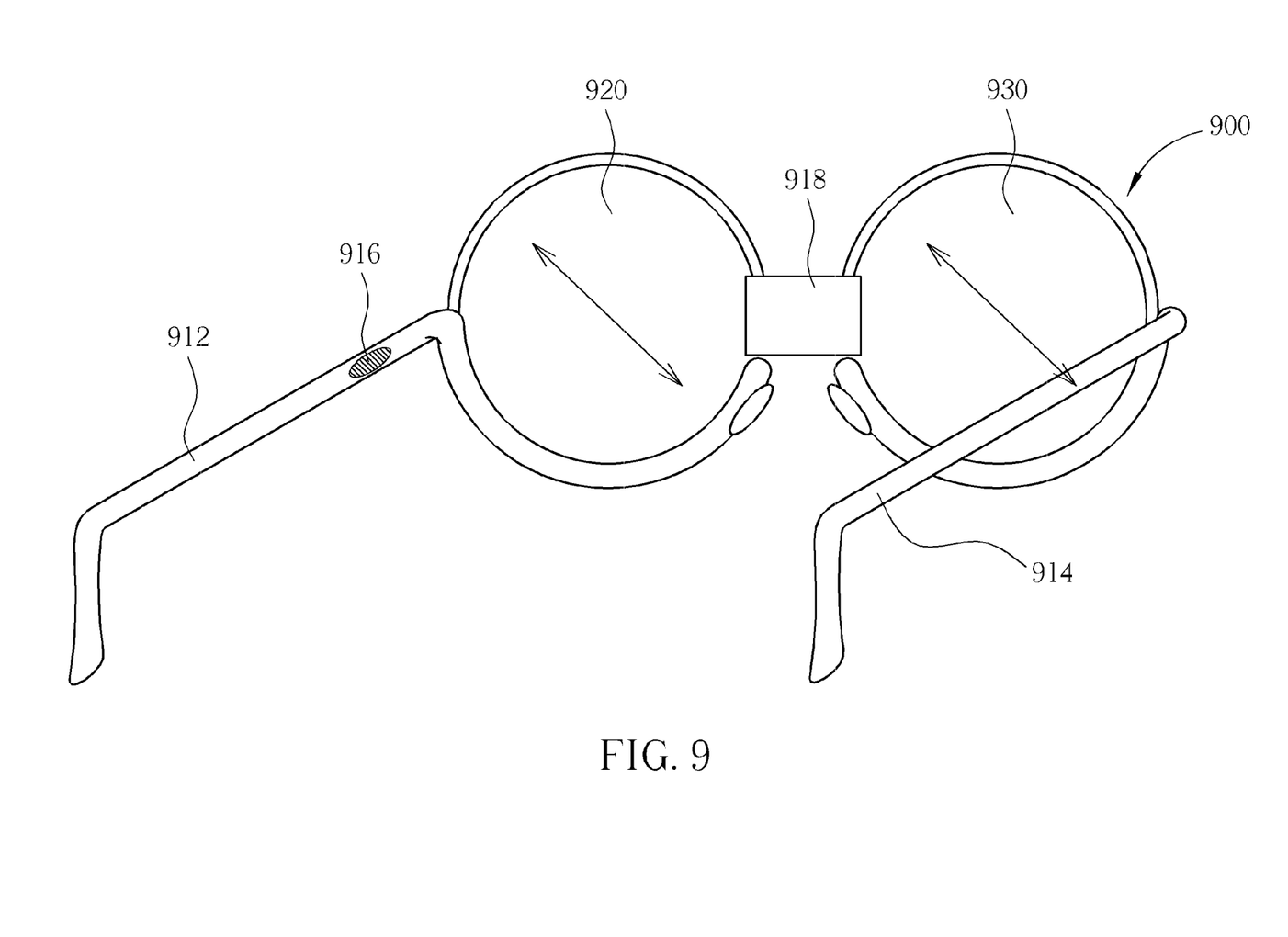
FIG. 9 is a diagram of a pair of shutter glasses for viewing stereo images according to a third exemplary embodiment of the present invention.

Please refer to FIG. 9. FIG. 9 is a diagram of a pair of shutter glasses 900 for viewing stereo images according to a third exemplary embodiment of the present invention. As shown in FIG. 9, the pair of shutter glasses 900 comprises frames 912, 914, two LC polarized lenses 920, 930, a battery 916 disposed in the frame 912 and a connection apparatus 918, wherein the connection apparatus 918 is utilized for connecting the two LC polarized lenses 920, 930, and providing a power transmission route in order to make a control chip (not shown) that is electrically connected to the battery 916 supply power to the two LC polarized lenses 920, 930. Besides, the connection apparatus 918 may let the two LC polarized lenses 920, 930 connect to each other by a latching manner, a magnetic coupling manner or a clipping manner, and the two LC polarized lenses 920, 930 may be any forms of LC polarized lenses.

Figure 10:
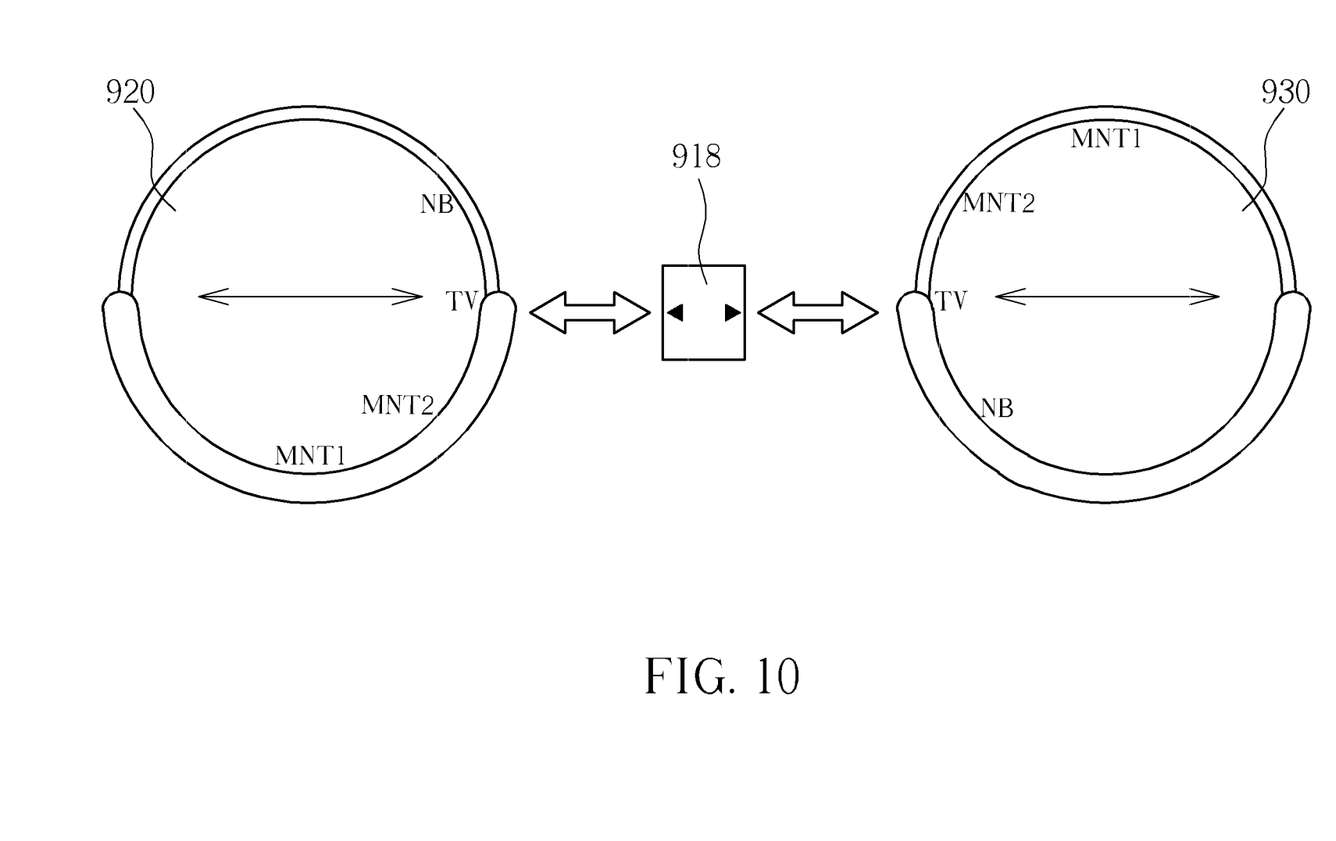
FIG. 10 is a diagram illustrating a plurality of lenses installation indicators on two liquid crystal polarized lenses shown in FIG. 9.

Besides, regarding an exemplary embodiment of the present invention, please refer to FIG. 10. A plurality of lens installation indicators MNT1, MNT2, TV, NB are disposed on the two LC polarized lenses 920, 930, respectively corresponding to a plurality of types of monitors whose image light outputs have different polarization directions, in order to indicate required lens installation directions of the two LC polarized lenses 920, 930 for allowing the user to assemble the pair of shutter glasses 900 correctly.

Besides, in the exemplary embodiments described above, two LC polarized lenses may be respectively disposed on the frame in any one of a plurality of different angles, and the plurality of different angles may be 0 degree, 45 degrees, 90 degrees, and 135 degrees. However, this is not meant to be a limitation of the present invention. As long as the different angles comprise at least two of 0 degree, 45 degrees, 90 degrees and 135 degrees, any alternative design falls within the scope of the present invention.

Briefly summarized, in the pair of shutter glasses for viewing stereo images according to the present invention, two LC polarized lenses are disposed on a frame according to any one of a plurality of different angles, where the plurality of different angles are defined for viewing a plurality of types of monitors whose image light outputs have different polarization directions. Thus, manufacturers do not have to redesign 3D glasses according to each monitor type. In this way, the production cost may be reduced greatly. In addition, the user only needs to buy one pair of 3D glasses to view a plurality of different monitors, which prevents the user to waste money on buying 3D glasses.

Those skilled in the art will readily observe that numerous modifications and alterations of the device and method may be made while retaining the teachings of the invention.

What is claimed is:

1. A pair of shutter glasses for viewing stereo images, comprising:
    a frame, comprising two sub-frames; and
    two liquid crystal polarized lenses, deposed on the two sub-frames of the frame in any one of a plurality of different angles, respectively, the plurality of different angles being defined for allowing a user to watch a plurality of types of monitors whose image light outputs have different polarization directions.

2. The pair of shutter glasses of claim 1, wherein the plurality of different angles comprise at lease two of 0 degree, 45 degrees, 90 degrees and 135 degrees.

3. The pair of shutter glasses of claim 1, wherein the frame has a plurality of lens installation indicators, respectively corresponding to the plurality of types of monitors whose image light outputs have different polarization directions, for indicating required lens installation positions of the two liquid crystal polarized lenses.

4. The pair of shutter glasses of claim 1, wherein any one of the two liquid crystal polarized lenses has a plurality of lens installation indicators, respectively corresponding to the plurality of types of monitors whose image light outputs have different polarization directions, for indicating required lens installation positions of the two liquid crystal polarized lenses.

5. The pair of shutter glasses of claim 1, wherein the two liquid crystal polarized lenses are rotatably fixed on the two sub-frames of the frame.

6. The pair of shutter glasses of claim 5, wherein each of the two liquid crystal polarized lenses has a round shape.

7. The pair of shutter glasses of claim 5, wherein the frame further comprises a rotating shaft, the two liquid crystal polarized lenses are rotatably fixed on the two sub-frames of the frame, and the rotating shaft is disposed between the two liquid crystal polarized lenses and is engaged with the two liquid crystal polarized lenses for driving the two liquid crystal polarized lenses to have rotations.

8. The pair of shutter glasses of claim 7, wherein the rotating shaft has a plurality of rotating angle indicators, respectively corresponding to the plurality of types of monitors whose image light outputs have different polarization directions, for indicating a required rotating angle of the rotating shaft.

9. The pair of shutter glasses of claim 1, wherein each of the two liquid crystal polarized lenses has a polygonal shape.

10. The pair of shutter glasses of claim 1, wherein a battery is disposed in the frame, there is at least one connection point on an edge of each of the two liquid crystal polarized lenses, and when the two liquid crystal polarized lenses are respectively deposed on the two sub-frames of the frame in any one of the plurality of different angles, the battery supplies power to the two liquid crystal polarized lenses by the at least one connection point on each of the two liquid crystal polarized lenses.

11. The pair of shutter glasses of claim 1, wherein the two liquid crystal polarized lenses are connected to each other by a latching manner, a magnetic coupling manner or a clipping manner.

12. The pair of shutter glasses of claim 1, wherein any one of the two liquid crystal polarized lenses comprises at least a first polarized lens, a liquid crystal layer and a second polarized lens in order.

13. The pair of shutter glasses of claim 1, wherein any one of the two liquid crystal polarized lenses comprises at least a group of liquid crystal modules and a polarized lens in order, and the group of liquid crystal modules comprises a liquid crystal layer or two liquid crystal layers.

* * * * *